United States Patent [19]

Ichikawa et al.

[11] Patent Number: 5,188,994
[45] Date of Patent: Feb. 23, 1993

[54] BETA ALUMINA SINTERED BODY AND METHOD OF MANUFACTURING THE SAME

[75] Inventors: Shuichi Ichikawa, Handa; Tomonori Takahashi, Chita, both of Japan

[73] Assignee: NGK Insulators, Ltd., Japan

[21] Appl. No.: 819,171

[22] Filed: Jan. 10, 1992

[30] Foreign Application Priority Data

Jan. 18, 1991 [JP] Japan ................... 3-041398

[51] Int. Cl.[5] ................ C04B 35/10; C04B 35/20; H01M 6/18
[52] U.S. Cl. ................... 501/153; 501/118; 501/127; 429/193
[58] Field of Search .......... 429/193, 33; 501/153, 501/127, 118

[56] References Cited

U.S. PATENT DOCUMENTS

| 3,687,735 | 8/1972 | Inoue. | |
|---|---|---|---|
| 4,138,455 | 2/1979 | Shaikh et al. | 429/193 X |
| 4,539,276 | 9/1985 | Harbach | 429/193 X |

FOREIGN PATENT DOCUMENTS

0110712 6/1984 European Pat. Off.
2006639 8/1970 Fed. Rep. of Germany.

OTHER PUBLICATIONS

Allitsch, G. et al., "Sodium Strontium) Beta Aluminas . . .", Inst. Tech. Elek., Ber. Bun.-GBS. Phys. Chem. 92(11), 1988, pp. 1303-1306.

Chemical Abstracts, vol. 92, No. 10, Mar. 10, 1980, Columbus, Ohio, US; abstract No. 86430z, T. Keneda; 'Ionic Conductivity and Raman Spectra of Sodium-Lithium, Potassium-Lithium and Potassium-Tin Beta-Alumina', p. 689.

Primary Examiner—John S. Maples
Attorney, Agent, or Firm—Parkhurst, Wendel & Rossi

[57] ABSTRACT

A beta alumina sintered body having a wide optimum sintering temperature range and a high sodium ion conductivity includes 8.0-10.0 wt % of sodium oxide, 3.0-5.5 wt % of magnesium oxide, 0.01-1.0 wt % of tin oxide, and the remainder of aluminum oxide. This sintered body is manufactured by mixing raw materials including 8.0-10.0 wt % of sodium oxide, 3.0-5.5 wt % of magnesium oxide, 0.01-1.0 wt % of tin oxide, and the remainder of aluminum oxide to obtain raw material powder; forming the raw material powder to obtain a formed body; and sintering the formed body to obtain a beta alumina sintered body.

5 Claims, 2 Drawing Sheets

● ○: Flexural Strength
▲ △: Relative Resistance

● ▲: 0.2 wt % of $SnO_2$ Added
○ △: No $SnO_2$ Added

FIG._1

● ○: Flexural Strength

▲ △: Relative Resistance

● ▲: 0.2 wt% of $SnO_2$ Added

○ △: No $SnO_2$ Added

● ○: Flexural Strength
▲ △: Relative Resistance
● ▲: 0.2 wt% of SnO₂ Added
○ △: 1.5 wt% of SnO₂ Added

BETA ALUMINA SINTERED BODY AND METHOD OF MANUFACTURING THE SAME

BACKGROUND OF THE INVENTION

1) Field of the Invention

The present invention relates to a sintered body consisting mainly of beta alumina used as a solid electrolyte (hereinafter, abbreviated as beta alumina sintered body) and a method of manufacturing the same and more, particularly relates to a beta alumina sintered body used for a sodium sulfur secondary cell and a method of manufacturing the same.

2) Related Art Statement

Since a beta alumina sintered body has a high sodium ion conductivity, it can be applied to a sodium sulfur secondary cell as a solid electrolyte for use in insulating metallic sodium as a cathode active material and molten sulfur as an anode active material thereof.

In the sodium sulfur secondary cell, almost all the inner resistance thereof is generated due to the solid electrolyte. Therefore, in order to minimize a decrease in output power when the cell is discharged and in order to reduce power loss when the cell is charged, it is desired to minimize the relative resistance of the cell within a preferred temperature range for using the beta alumina sintered body, for instance, at a temperature of 350° C. Further since the life of the sodium sulfur secondary cell depends upon the life of the solid electrolyte, i.e. the life of the beta alumina sintered body, it is desired that the beta alumina sintered body has high strength.

However, the beta alumina sintered body has a drawback in that its optimum sintering temperature range is small. Therefore, when the beta alumina sintered body is sintered at a temperature lower than its optimum sintering temperature range, the sintered body has a low density and many pores are obtained. On the contrary, if the beta alumina is sintered at a temperature higher than its optimum sintering temperature range, extraordinary grains, which make the strength of the sintered body small, are grown in the sintered body, so that the thus obtained sintered body would not be of practical use. Therefore, the beta alumina should be sintered with a great circumspection; and it is difficult to produce the beta alumina sintered body in great quantities in a big furnace, because a temperature distribution is generated in such a big furnace.

SUMMARY OF THE INVENTION

The present invention has for its object to provide a beta alumina sintered body, which has a large optimum sintering temperature range, and to provide a method of manufacturing the same. The beta alumina sintered body according to the invention has a high density even if it is sintered at a temperature lower than the optimum sintering temperature of the conventional sintered body; and the extraordinary grain growth is suppressed in the sintered body even if the beta alumina is sintered at a temperature higher than the conventional optimum sintering temperature; and further the beta alumina sintered body according to the invention has a particularly high sodium ion conductivity.

The first aspect of the present invention is to provide a beta alumina sintered body consisting essentially of 8.0–10.0 wt % of sodium oxide, 3.0–5.5 wt % of magnesium oxide, 0.01–1.0 wt % of tin oxide, and the remainder of aluminum oxide.

The second aspect of the present invention is to provide a method for manufacturing a beta alumina sintered body, which comprises the steps of mixing raw material consisting essentially of 8.0–10.0 wt % of sodium oxide, 3.0–5.5 wt % of magnesium oxide, 0.01–1.0 wt % of tin oxide, and the remainder of aluminum oxide to obtain raw material powder; forming the raw material powder to obtain a formed body; and sintering the formed body to obtain a beta alumina sintered body.

It should be noted that the beta alumina sintered body according to the invention is obtained in such a manner that: raw material consisting essentially of 8.0–10.0 wt % of sodium oxide, 3.0–5.5 wt % of magnesium oxide, 0.01–1.0 wt % of tin oxide, and the remainder of aluminum oxide is mixed to obtain raw material powder; the raw material powder is preliminarily calcined to obtain a $\beta''$ alumina powder; then forming the $\beta''$ alumina powder to obtain a formed body; and the formed body is sintered again.

Further, there are two ways of adding the tin oxide; one of them is to add the tin oxide into the raw material when the sodium oxide, the magnesium oxide and the aluminum oxide are mixed; and the other is to add the tin oxide into the $\beta''$ alumina powder obtained by calcining raw material consisting of the sodium oxide, the magnesium oxide and the aluminum oxide. Both ways are suitable, but it is preferred to add the tin oxide into the material after the preliminarily calcining has been performed.

It should be noted that the of tin oxide, sodium oxide, magnesium oxide and aluminum oxide may be provided by using other styles of raw materials such as carbonate, nitrate, sulfate and chloride, which are changed into oxides when these raw materials are sintered. A crystal phase of the sintered body consists mainly of $\beta''$ alumina, and includes a small amount of $\beta$ alumina and sodium aluminate according to circumstances.

The reason for limiting chemical compositions of the raw material in the present invention is as follows: If an amount of sodium oxide is less than 8 wt %, sintering would not be completely achieved. Contrary to this, if the amount of sodium oxide is more than 10 wt %, excessive sodium aluminate would remain in the crystal phase, and thus the relative resistance of the sintered body would become high. Further, when an amount of magnesium oxide is less than 3 wt %, a generation of $\beta$ alumina phase having a high resistance would be increased, and thus the relative resistance of the sintered body would become high. On the other hand, when the amount of the magnesium oxide is more than 5.5 wt %, a spinel phase would be generated in the crystal phase, then the density would not become high in the sintered body and a relative resistance of the sintered body would become high. Furthermore, if the amount of tin oxide is more than 1.0 wt %, extraordinary grains are apt to be grown, so that the strength of the sintered body is decreased when the raw materials are sintered at a high temperature.

As explained in the above, since the beta alumina sintering body according to the present invention consists essentially of magnesium oxide and tin oxide within the range stated in the above, the density of the sintered body becomes high even when the raw material is sintered at the lower temperature and the extraordinary grain growth is restricted even when the raw material is sintered at the higher temperature. As a result, the optimum sintering temperature range for sintering the raw material becomes wide; and it is possible to obtain a beta alumina sintered body having an extremely high sodium ion conductivity.

DESCRIPTION OF THE PREFERRED EMBODIMENT

Figure 1:
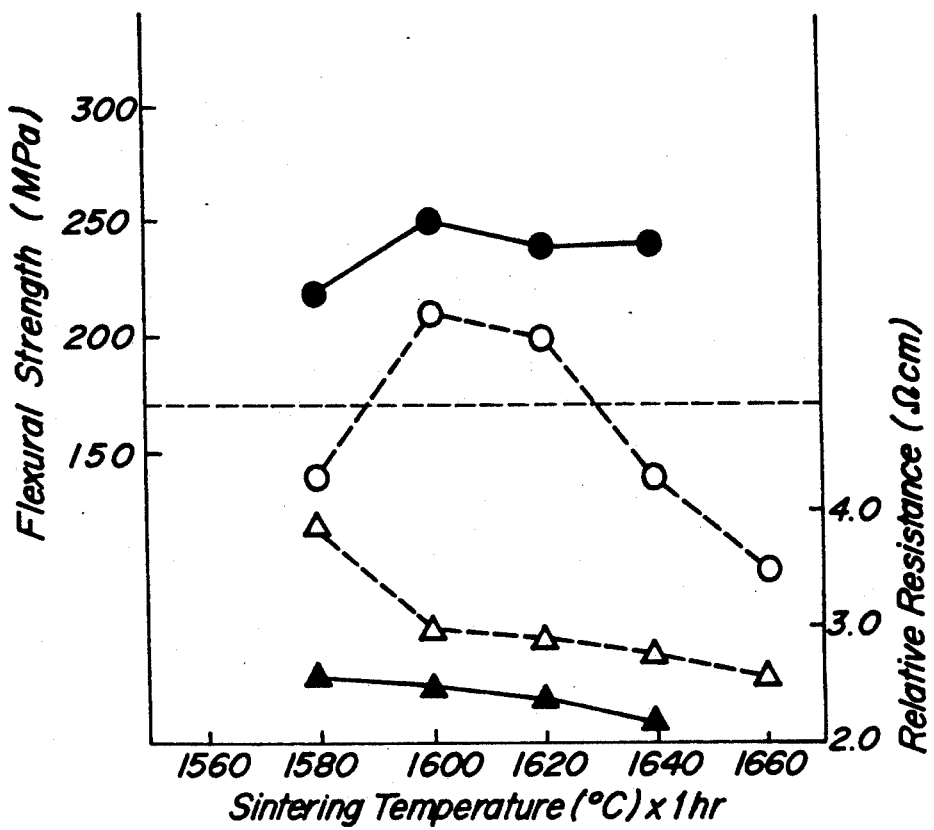
FIG. 1 is a graph showing relations between a strength of the sintered body and a sintering temperature and between a resistance of the sintered body and the sintering temperature, concerning one of the examples according to the present invention and one of comparative references.

Hereinafter, actual embodiments will be explained.

Embodiment 1

Alpha alumina powders having a purity of above 99.9%, $Na_2CO_3$ powders, and MgO powders were mixed with each other to obtain raw material powders having a composition shown in Table 1. Then the raw material powders were crushed in a ball mill by using ethanol, and the thus crushed raw material powders were calcined at 1200° C. for 4 hours to synthesize $\beta''$ alumina powder raw materials. Then, the $\beta''$ alumina powder raw materials were mixed with $SnO_2$ powders and further crushed in a ball mill by using ethanol to obtain $\beta''$ alumina powders. The thus obtained $\beta''$ alumina powders were granulated and preliminarily formed by using a metal mold to obtain a block specimen having a length of 50 mm, width of 25 mm and thickness of 7 mm. Further, the block specimen was formed under an isostatic pressure of 2.5 ton/cm$^2$; and then the thus formed block specimen was sintered at a given temperature for 1 hour in a MgO crucible. It should be noted that $SnO_2$ as an impurity was not included in the $\alpha$ alumina powders.

As to the thus obtained block specimen of the beta alumina sintered body, a bulk density was measured by a buoyancy method using butanol. Further, a stick-type specimen was cut out from the block specimen to measure its flexural strength using four support points and its relative resistance at 350° C. The relative resistance was measured by a complex impedance method using four terminals in which use was made of $NaNO_3$—$NaNO_2$ eutectic salts as electrodes. The crystal phase of the sintered body with the scope of the present invention consists mainly of $\beta''$ alumina, and a small amount of $\beta$ alumina or sodium aluminate was included according to circumstances. The measurement results in the above were shown in Table 1 and the measurement results concerning samples outside the scope of the invention were indicated in Table 2. It should be noted that each measurement result shown in Tables 1 and 2 is a mean value of five or more samples.

TABLE 1

| Sample No. | Na$_2$O (wt %) | MgO (wt %) | SnO$_2$ (wt %) | Al$_2$O$_3$ (wt %) | Sintering temperature (°C.) | Bulk density (g/cc) | Flexural strength (MPa) | Relative resistance (350° C., Ω · cm) |
| --- | --- | --- | --- | --- | --- | --- | --- | --- |
| Present Invention | | | | | | | | |
| 1 | 9.0 | 5.5 | 0.2 | Remainder | 1580 | 3.20 | 190 | 2.9 |
| | | | | | 1610 | 3.21 | 210 | 2.7 |
| | | | | | 1640 | 3.20 | 170 | 2.5 |
| 2a | 9.0 | 5.0 | 0.05 | Remainder | 1580 | 3.21 | 200 | 2.6 |
| | | | | | 1600 | 3.23 | 220 | 2.5 |
| | | | | | 1620 | 3.24 | 230 | 2.4 |
| | | | | | 1640 | 3.23 | 210 | 2.2 |
| 2b | 9.0 | 5.0 | 0.2 | Remainder | 1580 | 3.23 | 220 | 2.6 |
| | | | | | 1600 | 3.25 | 250 | 2.5 |
| | | | | | 1620 | 3.25 | 240 | 2.4 |
| | | | | | 1640 | 3.24 | 240 | 2.2 |
| 2c | 9.0 | 5.0 | 0.5 | Remainder | 1580 | 3.23 | 220 | 2.6 |
| | | | | | 1600 | 3.25 | 240 | 2.5 |
| | | | | | 1620 | 3.25 | 230 | 2.4 |
| | | | | | 1640 | 3.24 | 200 | 2.2 |
| 2d | 9.0 | 5.0 | 1.0 | Remainder | 1580 | 3.24 | 210 | 2.5 |
| | | | | | 1600 | 3.25 | 230 | 2.5 |
| | | | | | 1620 | 3.23 | 210 | 2.4 |
| | | | | | 1640 | 3.22 | 170 | 2.2 |
| 3 | 10.0 | 4.0 | 0.2 | Remainder | 1580 | 3.24 | 240 | 2.9 |
| | | | | | 1610 | 3.24 | 230 | 2.7 |
| | | | | | 1640 | 3.23 | 200 | 2.6 |
| 4 | 9.0 | 3.0 | 0.3 | Remainder | 1580 | 3.24 | 220 | 2.9 |
| | | | | | 1610 | 3.25 | 240 | 2.7 |
| | | | | | 1640 | 3.25 | 230 | 2.6 |
| 5 | 8.5 | 4.0 | 0.2 | Remainder | 1580 | 3.21 | 200 | 2.5 |
| | | | | | 1610 | 3.23 | 210 | 2.4 |
| | | | | | 1640 | 3.22 | 200 | 2.3 |
| 6 | 8.0 | 4.5 | 0.2 | Remainder | 1580 | 3.20 | 170 | 2.5 |
| | | | | | 1610 | 3.22 | 180 | 2.3 |
| | | | | | 1640 | 3.21 | 170 | 2.2 |

TABLE 2

| Sample No. | Na$_2$O (wt %) | MgO (wt %) | SnO$_2$ (wt %) | Al$_2$O$_3$ (wt %) | Sintering temperature (°C.) | Bulk density (g/cc) | Flexural strength (MPa) | Relative resistance (350° C., Ω·cm) |
|---|---|---|---|---|---|---|---|---|
| Comparative Example | | | | | | | | |
| 1a | 9.0 | 5.0 | 0 | Remainder | 1580 | 3.12 | 140 | 3.9 |
| | | | | | 1600 | 3.22 | 210 | 3.0 |
| | | | | | 1620 | 3.24 | 200 | 2.9 |
| | | | | | 1640 | 3.22 | 140 | 2.8 |
| | | | | | 1660 | 3.21 | 100 | 2.6 |
| 1b | 9.0 | 5.0 | 1.5 | Remainder | 1560 | 3.17 | 140 | 2.9 |
| | | | | | 1580 | 3.23 | 200 | 2.5 |
| | | | | | 1600 | 3.25 | 200 | 2.4 |
| | | | | | 1620 | 3.22 | 140 | 2.3 |
| | | | | | 1640 | 3.21 | 130 | 2.1 |
| 2 | 9.0 | 6.0 | 0.2 | Remainder | 1580 | 3.00 | 130 | 3.7 |
| | | | | | 1610 | 3.05 | 140 | 3.4 |
| | | | | | 1640 | 3.10 | 150 | 3.1 |
| 3 | 10.5 | 4.0 | 0.2 | Remainder | 1580 | 3.21 | 200 | 3.6 |
| | | | | | 1610 | 3.22 | 190 | 3.3 |
| | | | | | 1640 | 3.20 | 170 | 3.1 |
| 4 | 9.0 | 2.5 | 0.2 | Remainder | 1580 | 3.24 | 200 | 3.5 |
| | | | | | 1610 | 3.25 | 230 | 3.3 |
| | | | | | 1640 | 3.24 | 210 | 3.0 |
| 5 | 7.5 | 4.0 | 0.2 | Remainder | 1580 | 2.75 | 90 | 5.0 |
| | | | | | 1610 | 3.00 | 100 | 4.0 |
| | | | | | 1640 | 3.06 | 90 | 3.6 |

As clear from Table 1, each sintered body according to the present invention, which were sintered at temperatures 1,580° C.-1,640° C., has its characteristics such that the bulk density is 3.20 g/cc or more, the flexural strength using four support points is 170 MPa or more, the relative resistance at 350° C. 2.9 Ωcm or less, the optimum sintering temperature range is 60° C. or more and the sodium ion conductivity is extremely high. Particularly, the specimens including 8.5-10 wt % of sodium oxide, 3.0-5.0 wt % of magnesium oxide, 0.02-0.5 wt % of tin oxide and a remainder of aluminum oxide has a characteristic that the flexural strength is extremely high, i.e. 200 MPa or more. As apparent from Table 2, in each sintered body of the comparative references, which are not within the scope of the invention, the optimum sintering temperature range is small or the sodium ion conductivity becomes small. For instance, according to the composition of Sample No. 1a of the comparative references, the bulk density of the sintered body is small when the raw material thereof is sintered at a temperature lower than 1,600° C., and the flexural strength using four support points is decreased significantly, i.e. 140 MPa or less when the raw material thereof is sintered at a temperature higher than 1,620° C. The optimum sintering temperature range is also small, i.e. about 20° C.

Figure 2:
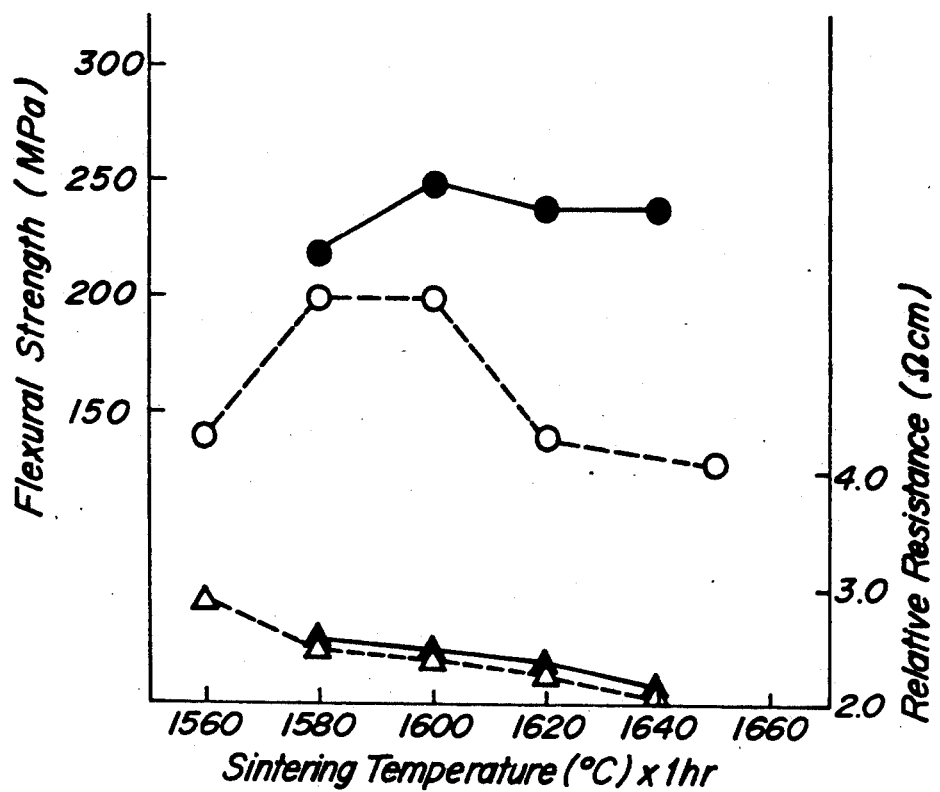
FIG. 2 is a graph showing relations between a strength of the sintered body and a sintering temperature and between a resistance of the sintered body and the sintering temperature, concerning another one of the examples according to the present invention and the other one of comparative references.

In the samples No. 2a, 2b, 2c and 2d according to the present invention and the samples No. 1a and 1b of the comparative references, the measurement was performed under the condition that the adding amount of tin oxide is varied but the amount of the Na$_2$O and MgO is constant. The relation between the flexural strength and the sintering temperature and the relation between the relative strength and the sintering temperature concerning sample No. 2b of the present invention and sample No. 1a of the comparative reference are shown in FIG. 1; and the relations concerning sample No. 2b of the present invention and sample No. 1b of the comparative reference are in FIG. 2. In FIG. 1, marks ● and ▲ represent the measurement results concerning the sample No. 2b of the present invention, into which 0.2 wt % of tin oxide was added; and marks ○ and Δ represent the measurement results concerning the sample No. 1a of the comparative reference, into which no tin oxide was added. And, in FIG. 2, marks ● and ▲ represent the measurement results concerning the sample No. 2b of the present invention, into which 0.2 wt % of tin oxide was added; and marks ○ and Δ represent the measurement results concerning the sample No. 1b of the comparative reference, into which no tin oxide was added. It can be read out from these figures that in case no tin oxide was added the bulk density did not become high at the low sintering temperature; and when 1 wt % or more tin oxide was added the flexural strength was decreased due to extraordinary grain growth at the high sintering temperature. It can be further read out that an increase of about 20% of the sodium ion conductivity can be performed by adding tin oxide into the raw material.

As explained in the above in detail, according to the present invention, it is possible to obtain a beta alumina sintered body having a large optimum sintering temperature range and an extremely high sodium ion conductivity by controlling each amount of composition thereof within a predetermined range, particularly by controlling the amount of tin oxide to be added. Therefore, it is possible to provide a beta alumina sintered body which is very useful for a sodium sulfur secondary cell.

What is claimed is:

1. A beta alumina sintered body consisting essentially of 8.0-10.0 wt % of sodium oxide, 3.0-5.5 wt % of magnesium oxide, 0.01-1.0 wt % of tin oxide, and the remainder of aluminum oxide.

2. The beta alumina sintered body of claim 1, wherein said body has a bulk density of at least 3.20 g/cc.

3. The beta alumina sintered body of claim 1, wherein said body has a four-point flexural strength of at least 170Mpa.

4. The beta alumina sintered body of claim 1, wherein said body has a relative resistance at 350° C. of no more than 2.9 Ωcm.

5. The beta alumina sintered body of claim 1, wherein said body has a sintering temperature range of at least 60° C.

* * * * *